US008657993B2

(12) United States Patent
Hayes et al.

(10) Patent No.: US 8,657,993 B2
(45) Date of Patent: Feb. 25, 2014

(54) ARTICLES SUCH AS SAFETY LAMINATES AND SOLAR CELL MODULES CONTAINING HIGH MELT FLOW ACID COPOLYMER COMPOSITIONS

(75) Inventors: Richard Allen Hayes, Beaumont, TX (US); Sam Louis Samuels, Landenberg, PA (US); Matthew Scott Hall, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 10 days.

(21) Appl. No.: 13/324,790

(22) Filed: Dec. 13, 2011

(65) Prior Publication Data

US 2012/0083065 A1 Apr. 5, 2012

Related U.S. Application Data

(62) Division of application No. 12/012,891, filed on Feb. 6, 2008, now abandoned.

(60) Provisional application No. 60/901,510, filed on Feb. 15, 2007.

(51) Int. Cl.
| | |
|---|---|
| *B29C 65/00* | (2006.01) |
| *B32B 37/00* | (2006.01) |
| *B32B 38/04* | (2006.01) |
| *C04B 37/00* | (2006.01) |
| *H01L 21/00* | (2006.01) |

(52) U.S. Cl.
USPC .............................. 156/325; 156/251; 438/64

(58) Field of Classification Search
USPC ..................... 156/251, 325; 438/64
See application file for complete search history.

(56) References Cited

U.S. PATENT DOCUMENTS

| | | | |
|---|---|---|---|
| 2,632,921 A | 3/1953 | Kreidl | |
| 2,648,097 A | 8/1953 | Kritchever | |
| 2,683,894 A | 7/1954 | Kritchever | |
| 2,704,382 A | 3/1955 | Kreidl | |
| 3,344,014 A | 9/1967 | Rees | |
| 3,404,134 A | 10/1968 | Rees | |
| 3,762,988 A | 10/1973 | Clock et al. | |
| 3,957,537 A | 5/1976 | Baskett et al. | |
| 4,035,549 A | 7/1977 | Kennar | |
| 4,104,216 A * | 8/1978 | Clampitt ........................ | 524/300 |
| 4,663,228 A | 5/1987 | Bolton et al. | |
| 4,668,574 A | 5/1987 | Bolton et al. | |
| 4,732,814 A | 3/1988 | Hatada et al. | |
| 4,799,346 A | 1/1989 | Bolton et al. | |
| 4,865,711 A | 9/1989 | Kittler | |
| 5,028,674 A | 7/1991 | Hatch et al. | |
| 5,411,845 A | 5/1995 | Robinson | |
| 5,415,942 A | 5/1995 | Anderson | |
| 5,476,553 A | 12/1995 | Hanoka et al. | |
| 5,478,402 A * | 12/1995 | Hanoka .......................... | 136/251 |
| 5,690,994 A | 11/1997 | Robinson | |
| 5,698,329 A | 12/1997 | Robinson | |
| 5,733,382 A | 3/1998 | Hanoka | |
| 5,759,698 A | 6/1998 | Tanuma et al. | |
| 5,762,720 A | 6/1998 | Hanoka et al. | |
| 5,763,062 A | 6/1998 | Smith et al. | |
| 5,770,312 A | 6/1998 | Robinson | |
| 5,895,721 A | 4/1999 | Naoumenko et al. | |
| 5,986,203 A | 11/1999 | Hanoka et al. | |
| 6,114,046 A | 9/2000 | Hanoka | |
| 6,150,028 A | 11/2000 | Mazon | |
| 6,187,448 B1 * | 2/2001 | Hanoka et al. ................. | 428/515 |
| 6,320,116 B1 | 11/2001 | Hanoka | |
| 6,414,236 B1 | 7/2002 | Kataoka et al. | |
| 6,432,522 B1 | 8/2002 | Friedman et al. | |
| 6,500,888 B2 | 12/2002 | Baumgartner et al. | |
| 6,514,425 B1 | 2/2003 | Sekiya et al. | |
| 6,518,365 B1 | 2/2003 | Powell et al. | |
| 6,586,271 B2 | 7/2003 | Hanoka | |
| 6,660,930 B1 | 12/2003 | Gonsiorawski | |
| 6,680,082 B2 | 1/2004 | Chou et al. | |

(Continued)

FOREIGN PATENT DOCUMENTS

| | | | |
|---|---|---|---|
| JP | 60 086058 A | 5/1985 | |
| JP | 60 086059 A | 5/1985 | |

(Continued)

OTHER PUBLICATIONS

DuPont™ SentryGlas® Plus Architectural Safety Glass brochure (2005).

(Continued)

*Primary Examiner* — Michael Orlando
(74) *Attorney, Agent, or Firm* — Maria M. Kourtakis; Kelly Law Registry

(57) ABSTRACT

A process of manufacturing a solar cell module, the process comprising:

(i) providing a solar cell pre-laminate assembly comprising a solar cell component comprising one or a plurality of solar cells and an encapsulant film or sheet consisting essentially of a non-neutralized acid copolymer composition prepared from (a) non-neutralized acid copolymer of an alpha olefin and about 15 to about 23 wt % of alpha,beta-ethylenically unsaturated carboxylic acid having 3 to 8 carbons, based on the total weight of the acid copolymer, wherein the acid copolymer has a Melt Index of greater than 100 to about 600 g/10 min, and (b) about 0.01 to about 10 wt %, based upon the total weight of the acid copolymer composition, of organic peroxide; and (ii) laminating the pre-laminate assembly to form the solar cell module by subjecting the assembly to heat and, optionally, vacuum.

20 Claims, No Drawings

(56) References Cited

U.S. PATENT DOCUMENTS

| | | | |
|---|---|---|---|
| 6,680,821 B2 | 1/2004 | Kang | |
| 6,693,237 B2 | 2/2004 | Zenko et al. | |
| 7,759,414 B2 | 7/2010 | Hayes et al. | |
| 7,943,845 B2 | 5/2011 | Hayes | |
| 8,080,726 B2 | 12/2011 | Hayes | |
| 8,133,752 B2 | 3/2012 | Hayes | |
| 8,168,885 B2 | 5/2012 | Hayes et al. | |
| 2002/0155302 A1 | 10/2002 | Smith et al. | |
| 2003/0000568 A1 | 1/2003 | Gonsiorawski | |
| 2004/0144415 A1 | 7/2004 | Arhart | |
| 2005/0089692 A1 | 4/2005 | Anderson | |
| 2005/0279401 A1 | 12/2005 | Arhart et al. | |
| 2006/0057392 A1 | 3/2006 | Smillie et al. | |
| 2006/0084763 A1 | 4/2006 | Arhart et al. | |
| 2006/0141212 A1 | 6/2006 | Smith et al. | |
| 2006/0165929 A1 | 7/2006 | Lenges et al. | |
| 2006/0182983 A1 | 8/2006 | Paul et al. | |
| 2006/0265929 A1 | 11/2006 | Haney | |
| 2007/0092706 A1 | 4/2007 | Pesek et al. | |
| 2007/0122633 A1 | 5/2007 | Pesek et al. | |
| 2007/0154694 A1 | 7/2007 | Samuels et al. | |
| 2007/0196630 A1 | 8/2007 | Hayes et al. | |
| 2007/0221268 A1 | 9/2007 | Hasch | |
| 2007/0228340 A1 | 10/2007 | Hayes et al. | |
| 2007/0267059 A1 | 11/2007 | Nishijima et al. | |
| 2007/0289693 A1 | 12/2007 | Anderson et al. | |
| 2008/0017241 A1 | 1/2008 | Anderson et al. | |
| 2008/0023063 A1 | 1/2008 | Hayes et al. | |
| 2008/0023064 A1 | 1/2008 | Hayes et al. | |
| 2008/0053516 A1 | 3/2008 | Hayes | |
| 2008/0099064 A1 | 5/2008 | Hayes | |
| 2008/0128018 A1 | 6/2008 | Hayes | |
| 2008/0199690 A1 | 8/2008 | Hayes | |
| 2008/0264471 A1 | 10/2008 | Hayes | |
| 2009/0023867 A1 | 1/2009 | Nishijima et al. | |
| 2009/0084424 A1 | 4/2009 | Hayes et al. | |
| 2009/0120489 A1 | 5/2009 | Nishijima et al. | |
| 2009/0126859 A1 | 5/2009 | Cadwallader et al. | |
| 2012/0085482 A1 | 4/2012 | Cadwallander et al. | |

FOREIGN PATENT DOCUMENTS

| | | | |
|---|---|---|---|
| JP | 62-108752 A | 5/1987 | |
| JP | 03 112836 A | 5/1991 | |
| JP | 04-177342 A | 6/1992 | |
| JP | 04 303650 A | 10/1992 | |
| JP | 06-322334 A | 11/1994 | |
| JP | 08-316508 A | 11/1996 | |
| JP | 11-026791 A | 1/1999 | |
| JP | 2000186114 A | 7/2000 | |
| JP | 2001089616 A | 4/2001 | |
| JP | 2001119047 A | 4/2001 | |
| JP | 2001119056 A | 4/2001 | |
| JP | 2001119057 A | 4/2001 | |
| JP | 2001144313 A | 5/2001 | |
| JP | 2001261904 A | 9/2001 | |
| JP | 2002-179738 A | 6/2002 | |
| JP | 2004031445 A | 1/2004 | |
| JP | 2004058583 A | 2/2004 | |
| JP | 2005-034913 | 2/2005 | |
| JP | 2005-064266 | 3/2005 | |
| JP | 2005-064268 | 3/2005 | |
| JP | 2006-036874 A | 2/2006 | |
| JP | 2006-036876 A | 2/2006 | |
| JP | 2006032308 A | 2/2006 | |
| JP | 2006036875 A | 2/2006 | |
| JP | 2006-186233 A | 7/2006 | |
| JP | 2006-186237 A | 7/2006 | |
| JP | 2006-190865 A | 7/2006 | |
| JP | 2006190867 | 7/2006 | |
| WO | 93/11175 A | 6/1993 | |
| WO | 99/58334 A2 | 11/1999 | |
| WO | 2006/057771 A2 | 6/2006 | |
| WO | 2006/070793 A1 | 7/2006 | |
| WO | 2006/085603 A1 | 8/2006 | |
| WO | 2006/095762 A1 | 9/2006 | |
| WO | 2006/095911 A1 | 9/2006 | |
| WO | 2007/094445 A1 | 8/2007 | |

OTHER PUBLICATIONS

DuPont™ SentryGlas®Plus Edge Stability Results—Seven Year Test (2005).
DuPont™ SentryGlas®Plus Interlayer, Technical Bulletin—Strength Characteristics (2005).
DuPont™ SentryGlas®Plus Interlayer, Technical Bulletin—Weathering (2005).
DuPont™ SentryGlas®Plus Interlayer, Technical bulletin—Sealant Compatibility (2005).
DuPont™ SentryGlas®Plus Interlayer, Technical Bulletin—Ultra-Violet Radiation Control (2005).
DuPont™ SentryGlas®Plus Interlayer, Technical Bulletin—Solar Energy Control (2005).
DuPont™ SentryGlas®Plus Interlayer, Technical Bulletin—Visual Quality (2005).
DuPont™ SentryGlas®Plus Interlayer, Technical Bulletin—Post-Glass Breakage Performance (2005).
Lenges, DuPont Photovoltaic Solutions, Encapsulation Technologies (2006).
DuPont Encapsulation Options, Resin Versus Interlayer Options (2007).
DuPont Encapsulation Offerings, Resins (2007).
DuPont™ SentryGlas® Interlayers, Interlayer Options for Solar Cell Encapsulation—SentryGlas® (2007).
DuPont Encapsulation Offerings, DuPont SentryGlas®Plus Interlayers, Options for Solar Cell Encapsulation—SentryGlas®Plus (2007).
ASTM D 1238—04c.
6. Butacite® polyvinyl butyral, PVB Laminating guide.
PCT International Search Report and Written Opinion for International Application No. PCT/US2008/002093, filed Feb. 15, 2008, dated Jun. 5, 2008.
Japanese Patent Application No. 2009-549640 Office Action Jul. 2012.

* cited by examiner

ARTICLES SUCH AS SAFETY LAMINATES AND SOLAR CELL MODULES CONTAINING HIGH MELT FLOW ACID COPOLYMER COMPOSITIONS

CROSS-REFERENCE TO RELATED APPLICATION

This application claims priority under 35 U.S.C. §120 as a divisional of U.S. patent application Ser. No. 12/012,891, filed on Feb. 6, 2008, and now abandoned, which in turn claims priority to U.S. Provisional Appln. No. 60/901,510, filed on Feb. 15, 2007, each of which is incorporated herein by reference in its entirety.

FIELD OF THE INVENTION

The invention relates to polymeric films or sheets comprising acid copolymer compositions, and their use in articles such as safety laminates and solar cell modules.

BACKGROUND OF THE INVENTION

Glass laminated products have contributed to society for almost a century. Beyond the well known, every day automotive safety glass used in windshields, laminated glass is used in all forms of the transportation industry. Safety glass is characterized by high impact and penetration resistance and does not scatter glass shards and debris when shattered.

Safety glass typically consists of a sandwich of two glass sheets or panels bonded together with an interlayer of a polymeric sheet. One or both of the glass sheets may be replaced with optically clear rigid polymeric sheets, such as sheets made of polycarbonates. Safety glass has further evolved to include multiple layers of glass and polymeric sheets bonded together with interlayers of polymeric sheets.

The interlayers used in safety glass are typically made from relatively thick polymer sheets, which exhibit toughness and bondability to the glass in the event of a crack or crash. Widely used interlayer materials include complex, multicomponent compositions based on poly(vinyl butyral) (PVB), poly(urethane) (PU), poly(ethylene vinyl acetate) (EVA), acid copolymers and ionomers derived therefrom, and the like.

As a renewable energy resource, the use of solar cell modules is rapidly expanding. One preferred way of manufacturing a solar cell module involves forming a pre-laminate assembly comprising at least 5 structural layers. The solar cell pre-laminates are constructed in the following order starting from the top, or incident layer (that is, the layer first contacted by light) and continuing to the backing (the layer furthest removed from the incident layer): (1) incident layer (typically a glass plate or a thin polymeric film (such as a fluoropolymer or polyester film), but could conceivably be any material that is transparent to sunlight), (2) front encapsulant layer, (3) voltage-generating component (or solar cell component), (4) back encapsulant layer, and (5) backing layer.

The encapsulant layers are designed to encapsulate and protect the fragile voltage-generating component. Generally, a solar cell pre-laminate will incorporate at least two encapsulant layers sandwiched around the solar cell component. The optical properties of the front encapsulant layer must be such that light can be effectively transmitted to the solar cell component. Additionally, encapsulant layers generally have similar requirements and compositions to that described above for glazing interlayers.

The use of acid copolymer compositions as solar cell encapsulant films and sheets has been known within the art (see, e.g., U.S. Pat. No. 3,957,537; U.S. Pat. No. 6,187,448; U.S. Pat. No. 6,320,116; U.S. Pat. No. 6,414,236; U.S. Pat. No. 6,586,271; U.S. Pat. No. 6,693,237; JP 2000186114; JP 2001089616; JP 2001119047; JP 2001119056; JP 2001119057; JP 2001144313; JP 2001261904; JP 2004031445; JP 2004058583; JP 2006032308; JP 2006036875; and JP 2006190867). For example, U.S. Pat. No. 6,187,448 and U.S. Pat. No. 6,320,116 disclose a multi-layer solar cell encapsulant sheet that includes an acid copolymer layer. U.S. Pat. No. 6,414,236; U.S. Pat. No. 6,693,237 and JP 2006036875 disclose acid copolymer compositions containing organic peroxides and silane coupling agents as solar cell encapsulant sheet materials. JP 2000186114 discloses acid copolymer compositions, ionomeric compositions, and blends thereof as solar cell encapsulant sheets. JP 2001144313, JP 2004031445, JP 2004058583, JP 2006032308 and JP 2006190867 disclose acid copolymer compositions containing silane coupling agents as solar cell encapsulant sheet materials.

However, the acid copolymer resins being used in the art of solar cell modules generally have a low melt flow index (MI) of 25 g/10 min or less. The use of such low melt flow acid copolymer resins requires higher lamination temperatures (i.e., 130° C.-170° C.) and therefore may complicate the lamination process.

There is a need for polymeric film or sheet suitable for use as interlayers in glass laminate end-use applications, such as safety windows and solar cells, which do not have the shortcomings described above, as well as for compositions useful in forming such films or sheets. For instance, there is a desire to prepare useful compositions with a reduced extrusion compounding temperature. For instance, there is a desire to reduce the lamination temperature, preferably to about 100° C. to about 120° C., or to reduce the lamination cycle time, or both, and therefore simplifying the lamination process. In addition, there is a desire for films or sheets that have enhanced adhesion strength under wide variety of lamination temperatures, including such desirable lower temperatures, and to provide the laminates with improved shock resistance.

SUMMARY OF THE INVENTION

The invention is directed to a polymeric film or sheet comprising an acid copolymer composition comprising an acid copolymer of an alpha olefin and about 1 to about 30 wt % of alpha,beta-ethylenically unsaturated carboxylic acid having 3 to 8 carbons, based on the total weight of the acid copolymer, wherein the acid copolymer has a Melt Index of about 75 to about 600 g/10 min.

Preferably the acid copolymer has a Melt Index of about 100 to about 400 g/10 min.

Preferably the alpha olefin is ethylene.

Preferably the alpha,beta-ethylenically unsaturated carboxylic acid is selected from the group consisting of acrylic acid, methacrylic acid, itaconic acid, maleic acid, maleic anhydride, fumaric acid, monomethyl maleic acid, and mixtures thereof.

Preferably the ionomeric copolymer comprises about 10 to about 25 wt % (more preferably about 15 to about 23 wt %, and most preferably about 18 to about 23 wt %) of the alpha, beta-ethylenically unsaturated carboxylic acid.

The films or sheets of the invention preferably have a total thickness of about 0.1 mil (0.003 mm) to about 250 mils (6.35 mm). In one embodiment, the polymeric film or sheet preferably has a thickness of about 10 to about 250 mils (about 0.25 to about 6.35 mm). In another embodiment, the polymeric film or sheet preferably has a thickness of about 0.1 to about 10 mils (about 0.003 to about 0.25 mm). In a third embodiment, the thickness is preferably about 10 to about 20 mils (about 0.25 to about 0.51 mm).

Preferably the acid copolymer composition further comprises an additive selected from the group consisting of silane coupling agent, organic peroxide, and combinations thereof.

In one preferred embodiment, the acid copolymer composition contains about 0.01 to about 5 wt % (more preferably about 0.05 to about 1 wt %) of the silane coupling agent, based on the total weight of the acid copolymer composition. Preferably the silane coupling agent is selected from the group consisting of gamma-chloropropylmethoxysilane, vinyltrimethoxysilane, vinyltriethoxysilane, vinyltris(beta-methoxyethoxy)silane,gamma-vinylbenzylpropyltrimethoxysilane, N-beta-(N-vinylbenzylaminoethyl)-gamma-aminopropyltrimethoxysilane, gamma-methacryloxypropyltrimethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and mixtures thereof.

In another preferred embodiment, the acid copolymer composition contains about 0.01 to about 10 wt % (preferably about 0.5 to about 3 wt %) of the organic peroxide, based on the total weight of the acid copolymer composition. Preferably the organic peroxide is selected from the group consisting of 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha, alpha'-bis(tert-butyl-peroxyisopropyl)benzene, n-butyl-4,4-bis(tert-butylperoxy)valerate, 2,2-bis(tert-butylperoxy)butane, 1,1-bis(tert-butylperoxy)cyclohexane, 1,1-bis(tert-butylperoxy)-3,3,5-trimethyl-cyclohexane, tert-butyl peroxybenzoate, benzoyl peroxide and mixtures thereof.

The invention is also directed to an article comprising an interlayer formed of the polymeric film or sheet and an additional layer selected from the group consisting of glass, other polymeric interlayer sheets, polymeric film layers, and metal films or sheets.

By "other polymeric interlayer sheets" reference is made to an interlayer sheet that may be the same as or different than interlayer formed of the polymeric film or sheet. Preferably the other polymeric interlayer sheets are formed of materials selected from the group consisting of acid copolymers and ionomers derived therefrom, poly(ethylene-co-vinyl acetate) (EVA), poly(vinyl acetal), polyurethane (PU), polyvinylchloride (PVC), polyethylenes, polyolefin block elastomers, ethylene acrylate ester copolymers, silicone elastomers and epoxy resins. In one preferred embodiment, the other polymeric interlayer sheet is the same or substantially similar to the interlayer formed of the polymeric film or sheet.

Preferably the polymeric film layers are formed of materials selected from the group consisting of polyesters, poly(ethylene naphthalate), polycarbonate, polyolefins, norbornene polymers, polystyrene, styrene-acrylate copolymers, acrylonitrile-styrene copolymers, polysulfones, nylons, poly(urethanes), acrylics, cellulose acetates, cellophane, vinyl chloride polymers, and fluoropolymers.

In a preferred embodiment, the article is a safety glass laminate wherein the additional layer is a glass sheet and the interlayer is laminated to the glass sheet. Preferably the interlayer is self-adhered to the glass sheets. Preferably the safety glass laminate comprises two sheets of glass and the interlayer is laminated between the glass sheets. Preferably the interlayer is self-adhered to the two glass sheets. Preferably the interlayer has a thickness of about 10 to about 250 mils (about 0.25 to about 6.35 mm).

In another preferred embodiment, the article is a solar cell pre-laminate assembly and comprises a solar cell component comprising one or a plurality of solar cells. The solar cell pre-laminate assembly preferably further comprises a second polymeric layer that is positioned next to the solar cell component on the opposite side from the polymeric film or sheet, wherein the second polymeric layer comprises a polymeric composition selected from the group consisting of poly(vinyl acetal), ethylene vinyl acetate, polyurethane, polyvinylchloride, polyethylenes, polyolefin block elastomers, ethylene acrylate ester copolymers, copolymer of alpha olefin and alpha,beta-ethylenically unsaturated carboxylic acid and ionomers thereof, silicone elastomers and epoxy resins. The solar cell pre-laminate assembly preferably an incident layer that is formed of a transparent material (preferably glass or a plastic film or sheet, most preferably glass) and serves as an outer layer at the light-receiving side of the assembly.

The solar cell pre-laminate assembly preferably comprises a backing layer that serves as an outer layer at the back side of the assembly, wherein the backing layer preferably is formed of glass, plastic films or sheets, or metal films or sheets.

In one preferred embodiment, the solar cell pre-laminate assembly consists essentially of, from top to bottom, (i) an incident layer formed of a transparent material, which is positioned next to, (ii) a front encapsulant layer that is positioned next to, (iii) a solar cell component comprising one or a plurality of solar cells, which is positioned next to, (iv) an optional back encapsulant layer that is positioned next to, (v) a backing layer, wherein at least one of the encapsulant layers is formed of the polymeric film or sheet.

The invention is further directed to an article which is a solar cell prepared by the steps comprising (a) providing interlayer formed of the polymeric film or sheet, (b) providing a solar cell component comprising one or a plurality of solar cells; and (c) encapsulating the solar cell component in a matrix comprising the acid copolymer composition. The invention is also directed to a process of manufacturing an article, wherein the article is a solar cell module, the process comprising: (i) providing a solar cell pre-laminate assembly, and (ii) laminating the pre-laminate assembly to form the solar cell module. Preferably the step of lamination is conducted by subjecting the assembly to heat and, optionally, vacuum.

The invention is also directed to an improved polymeric composition comprising an acid copolymer composition and an additive, wherein (i) the acid copolymer composition comprises a copolymer of an alpha olefin and about 1 to about 30 wt % of an alpha,beta-ethylenically unsaturated carboxylic acid having 3 to 8 carbons, based on the total weight of the acid copolymer, (ii) the acid copolymer has a Melt Index of about 75 to about 600 g/10 min and (iii) the additive is selected from the group consisting of silane coupling agent, organic peroxide, and combinations thereof. The invention is also directed to shaped articles comprising this polymeric composition. Preferably the shaped article is a polymeric film or sheet. Preferably the film or sheet is a multilayer film or sheet comprising one surface layer formed of the polymeric composition. Preferably the multilayer film or sheet comprises two surface layers with both being formed of the polymeric composition. One preferred embodiment is a solar cell or solar cell pre-laminate.

DETAILED DESCRIPTION OF THE INVENTION

All publications, patent applications, patents, and other documents mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format."

Where applicants have defined an invention or a portion thereof with an open-ended term such as "comprising," it should be readily understood that (unless otherwise stated) the description should be interpreted to also describe such an invention using the terms "consisting essentially of" or "consisting of."

Use of "a" or "an" are employed to describe elements and components of the invention. This is done merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to make them or the amounts of the monomers used to make them or by the monomer residues incorporated within them. While such a description may not include the specific nomenclature used to describe the final polymer or may not contain product-by-process terminology, any such reference to monomers, monomer residues, repeat units and amounts should be interpreted to mean that the polymer is made from those monomers or that amount of the monomers, and the corresponding polymers and compositions thereof. In this regard, a reference to a copolymer containing residues of a monomer is referring to the fact that the copolymer contains repeat units from that monomer. When applicants refer to a copolymer containing a percentage of a monomer, it should be understood that this reference is to the copolymer containing repeat units from that monomer.

In describing and/or claiming this invention, the term "copolymer" is used to refer to polymers containing two or more monomers.

The terms "finite amount" and "finite value" are used to refer to an amount that is greater than zero.

The term "acid copolymer" is used to refer to a resin composition comprised of copolymerized residues of an alpha olefin and copolymerized residues of an alpha, beta-ethylenically unsaturated carboxylic acid having 3 to 8 carbons. The term "ionomer" is used herein to refer to a resin composition derived from a partially or fully neutralized "acid copolymer". It should be understood that reference to "acid copolymer" is to a composition that is not so neutralized.

High Melt Flow Acid Copolymer Compositions

The invention is related to certain high melt flow acid copolymer compositions that are useful in forming safety interlayer sheets or solar cell encapsulant films or sheets. Specifically, the high melt flow acid copolymer composition is comprised of an acid copolymer having a MI of about 75 to about 600 g/10 min as measured by ASTM D1238 at 190° C. and a 2160 g load. (A similar ISO test is ISO 1133.)

Acid Copolymer Resins:

The high melt flow acid copolymer is comprised of a finite amount of an alpha olefin and about 1 to about 30 wt % of an alpha,beta-ethylenically unsaturated carboxylic acid having 3 to 8 carbons, based on the total weight of the copolymer. Preferably, the acid copolymer comprises about 10 to about 25 wt %, or more preferably, about 15 to about 23 wt %, or yet more preferably, about 18 to about 23 wt %, of the alpha,beta-ethylenically unsaturated carboxylic acid, based on the total weight of the acid copolymer.

The alpha olefin comonomers typically incorporate from 2 to 10 carbon atoms. Preferable alpha olefins include, but are not limited to, ethylene, propylene, 1-butene, 1-pentene, 1-hexene, 1-heptene, 3-methyl-1-butene, 4-methyl-1-pentene, and the like and mixtures thereof. More preferably, the alpha olefin is ethylene. The alpha,beta-ethylenically unsaturated carboxylic acid comonomers may include acrylic acid, methacrylic acid, itaconic acid, maleic acid, maleic anhydride, fumaric acid, monomethyl maleic acid, and mixtures thereof. Preferable alpha,beta-ethylenically unsaturated carboxylic acid comonomers include acrylic acid, methacrylic acid and mixtures thereof.

The acid copolymers may be polymerized as disclosed in U.S. Pat. No. 3,404,134; U.S. Pat. No. 5,028,674; U.S. Pat. No. 6,500,888; and U.S. Pat. No. 6,518,365.

The high melt flow acid copolymers have a MI of about 75 to about 600 g/10 min, preferably about 100 to about 400 g/10 min.

Such a high melt flow rate provides the acid copolymer films or sheets derived therefrom with reduced lamination temperatures, or shorter cycle time, or both, when they are used in safety laminates or solar cell laminates. Moreover, when laminated under the lamination temperatures used herein, films or sheets derived from such high melt flow acid copolymer compositions possess higher adhesion strength than those derived from acid copolymer compositions with relatively lower melt flow rates.

The high melt flow acid copolymers may optionally contain other unsaturated comonomers. Specific examples of preferable other unsaturated comonomers include, but are not limited to, methyl acrylate, methyl methacrylate, ethyl acrylate, ethyl methacrylate, isopropyl acrylate, isopropyl methacrylate, butyl acrylate, butyl methacrylate and mixtures thereof. In general, the acid copolymers may incorporate 0 to about 50 wt %, or preferably, 0 to about 30 wt %, or more preferably, 0 to about 20 wt %, of the other unsaturated comonomer(s), based on the total weight of the copolymer.

Additives:

The high melt flow acid copolymer composition may further comprise one or more additives.

In one particular embodiment, the acid copolymer composition further comprises one or more silane coupling agents to further enhance the adhesion strength of the films or sheets derived therefrom.

Exemplary silane coupling agents that are useful in the invention include, but are not limited to, gamma-chloropropylmethoxysilane, vinyltrimethoxysilane, vinyltriethoxysilane, vinyltris(beta-methoxyethoxy)silane,gamma-vinylbenzylpropyltrimethoxysilane, N-beta-(N-vinylbenzylaminoethyl)-gamma-aminopropyltrimethoxysilane, gamma-methacryloxypropyltrimethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and the like and mixtures thereof. The silane coupling agents are preferably incorporated in the acid copolymer compositions at a level of about 0.01 to about 5 wt %, or more preferably, about 0.05 to about 1 wt %, based on the total weight of the composition.

It is noted that the silane coupling agents can reduce the melt flow rate of the acid copolymer compositions to which they are incorporated. Therefore, with a set level of silane, the high melt flow acid copolymer compositions can maintain a certain level of viscosity than the prior art lower melt flow acid copolymer compositions.

In another embodiment of the invention, the acid copolymer compositions may further comprise additives which effectively reduce the melt flow of the resin, to the limit of thermosetting the films or sheets during lamination. The use of such additives will enhance the upper end-use temperature and reduce creep of the laminate interlayer sheets or solar cell encapsulant films or sheets derived therefrom. Typically, the end-use temperature may be enhanced up to about 20 to about 70° C. In addition, safety laminates and solar cell laminates produced from such materials will be fire resistant. Specifically, by thermosetting the acid copolymer resins during lamination, the resins will have a reduced tendency to melt and flow out of the laminate, which in turn, may serve as additional fuel for a fire.

Typically, the effective melt flow reducing additives are organic peroxides, such as 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha,alpha'-bis(tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide, and the like and mixtures combinations thereof. Preferably the organic peroxides decompose at a temperature of about 100° C. or higher to generate radicals. More preferably, the organic peroxides have a decomposition temperature which affords a half life of 10 hours at about 70° C. or higher to provide improved stability for blending operations.

Moreover, the temperature gap between the acid copolymer composition compounding temperature and the organic peroxide decomposition temperature is critical to avoid premature crosslinking during the compounding and film and sheet formation processes. In an extrusion process (which is the preferred process for producing the compositions and manufacturing the high melt flow acid copolymer films or sheets), the high melt flow acid copolymer compositions require desirable reduced extrusion temperatures when compared to the otherwise lower melt flow acid copolymer compositions and therefore effectively preventing premature crosslinking during extrusion compounding, film or sheet formation.

Preferably, the organic peroxides are added at a level of about 0.01 to about 10 wt %, or preferably, about 0.5 to about 3.0 wt %, based on the total weight of the composition.

If desired, initiators, such as dibutyltin dilaurate, may also be contained in the acid copolymer composition at a level of about 0.01 to about 0.05 wt %, based on the total weight of the composition. In addition, if desired, inhibitors, such as hydroquinone, hydroquinone monomethyl ether, p-benzoquinone, and methylhydroquinone, may be added for the purpose of enhancing control to the reaction and stability. Typically, the inhibitors would be added at a level of less than about 5 wt %, based on the total weight of the composition.

In yet another embodiment, the high melt flow acid copolymer composition may further comprise any other suitable additive(s) known within the art. Such additives may include, but are not limited to, plasticizers, processing aides, flow enhancing additives, lubricants, pigments, dyes, flame retardants, impact modifiers, nucleating agents, antiblocking agents (e.g., silica), thermal stabilizers, UV absorbers, UV stabilizers, dispersants, surfactants, chelating agents, coupling agents, adhesives, primers, reinforcement additives (e.g., glass fiber), fillers, and the like. Generally, when used in solar cell encapsulant films or sheets, the additives that may reduce the optical clarity of the compositions, such as reinforcement additives and fillers, are reserved for those films or sheets used as the back encapsulant layers.

Thermal stabilizers can be used and have been widely disclosed within the art. Any known thermal stabilizer may find utility within the invention. Preferable general classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds that destroy peroxide, hydroxylamines, nitrones, thiosynergists, benzofuranones, indolinones, and the like and mixtures thereof. The high melt flow acid copolymer compositions may contain any effective amount of thermal stabilizers. Use of a thermal stabilizer is optional and in some instances is not preferred. When used, the high melt flow acid copolymer compositions contain at least about 0.05 wt %, and up to about 10 wt %, more preferably up to about 5 wt %, and most preferably up to about 1 wt %, of thermal stabilizers, based on the total weight of the composition.

UV absorbers can be used and have also been widely disclosed within the art. Any known UV absorber may find utility within the invention. Preferable general classes of UV absorbers include, but are not limited to, benzotriazoles, hydroxybenzophenones, hydroxyphenyl triazines, esters of substituted and unsubstituted benzoic acids, and the like and mixtures thereof. The high melt flow acid copolymer compositions may contain any effective amount of UV absorbers. Use of a UV absorber is optional and in some instances is not preferred. When used, the high melt flow acid copolymer compositions contain at least about 0.05 wt %, and up about 10 wt %, more preferably up to about 5 wt %, and most preferably up to about 1 wt %, of UV absorbers, based on the total weight of the composition.

Hindered amine light stabilizers (HALS) can be used and have also been widely disclosed within the art. Generally, Hindered amine light stabilizers are disclosed to be secondary, tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function. The high melt flow acid copolymer compositions may contain any effective amount of hindered amine light stabilizers. Use of hindered amine light stabilizers is optional and in some instances is not preferred. When used, the high melt flow acid copolymer compositions contain at least about 0.05 wt %, and up to about 10 wt %, more preferably up to about 5 wt %, and most preferably, up to about 1 wt %, of hindered amine light stabilizers, based on the total weight of the composition.

High Melt Flow Acid Copolymer Films or Sheets

The invention further provides shaped articles, such as, films or sheets comprising the high melt flow acid copolymer compositions. These high melt flow acid copolymer films and sheets may be produced by any suitable process. For example, the films and sheets may be formed through dipcoating, solution casting, compression molding, injection molding, melts extrusions, melt blowing, or any other procedures that are known to those of skill in the art. Preferably, the high melt flow acid copolymer films and sheets are formed by melt extrusion, which is a particularly preferred process for formation of "endless" products.

As discussed above, the high melt flow acid copolymer films or sheets are useful in forming the interlayer sheets in safety laminates or encapsulant films or sheets in solar cell laminates. Moreover, the high melt flow acid copolymer films or sheets may take the form of single-layer or multilayer films or sheets. By single-layer, it is meant that the film or sheet has only one single layer and that the one single layer is made of the high melt flow acid copolymer composition. By multilayer, it is meant that the high melt flow acid copolymer film or sheet has two or more sub-layers and that at least one of the sub-layers is made of the high melt flow acid copolymer composition. The other sub-layer(s) of the multilayer film or sheet may be made of any suitable polymeric compositions. Preferably, however, the other sub-layer(s) is made of polymeric compositions selected from the group consisting of acid copolymers and ionomers derived therefrom, poly(ethylene vinyl acetate), poly(vinyl acetal) (e.g., poly(vinyl butyral)), polyurethane, polyvinylchloride, polyethylenes (e.g., metallocene-catalyzed linear low density polyethylenes), polyolefin block elastomers, ethylene acrylate ester copolymers (e.g., poly(ethylene-co-methyl acrylate) and poly(ethylene-co-butyl acrylate)), silicone elastomers and epoxy resins. More preferably, the other sub-layers are formed of polymeric compositions selected from the group consisting of acid copolymers and ionomers derived therefrom, poly(ethylene vinyl acetate), metallocene-catalyzed linear low density polyethylenes, polyolefin block elastomers, and ethylene acrylate ester copolymers. Moreover, to provide adequate adhesion strength, at least one, or preferably, both, of the surface sub-layers of the multilayer film or sheet are formed of the high melt flow acid copolymer compositions. In one preferred embodiment, multilayer films and sheets with high flow acid copolymer surfaces and low flow core layers provide the desirable low lamination temperatures and high adhesion of the invention.

The films or sheets of the invention preferably have a total thickness of about 0.1 mil (0.003 mm) to about 250 mils (6.35 mm). When used as a safety laminate interlayer sheet, the high melt flow acid copolymer sheet preferably has a total thickness of about 10 mils (0.25 mm) to about 250 mils (6.35 mm), or more preferably, about 15 mils (0.38 mm) to about 90 mils (2.28 mm), or yet more preferably, about 30 mils (0.76 mm) to about 60 mils (1.52 mm). Also in accordance to the invention, for use as a solar cell encapsulant the sheet or film preferably has a thickness of about 0.1 mil (0.003 mm) to about 20 mils (0.51 mm). That is, when used in a flexible solar cell laminate as a solar cell encapsulant film, the high melt flow acid copolymer film preferably has a total thickness of about 0.1 mil (0.003 mm) to about 10 mils (0.25 mm), or more preferably, about 1 mil (0.03 mm) to about 5 mils (0.13 mm), while when used in a rigid solar cell laminate as a solar cell encapsulant sheet, the high melt flow acid copolymer sheet preferably has a total thickness of about 10 mils (0.25 mm) to about 20 mils (0.51 mm). The thickness of the individual sub-layers that make up the total multilayer acid copolymer film or sheet is not critical and may be independently varied depending on the particular application. Preferably, however, the surface layers of a multilayer film or sheet should have a thickness of about 1 mil (0.03 mm) to about 5 mils (0.13 mm).

The high melt flow acid copolymer films or sheets may have smooth or rough surfaces on one or both sides. Preferably, the high melt flow films or sheets have rough surfaces to facilitate the de-airing of the laminates through the laminate process. Providing channels for the escape of air and removing air during lamination is a known method for obtaining laminates having acceptable appearance. Rough surfaces can be effected by mechanically embossing or by melt fracture during extrusion of the interlayer sheet or encapsulant film or sheet followed by quenching so that the roughness is retained during handling. The surface pattern can be applied to the high melt flow acid copolymer film or sheet through common art processes. For example, the as extruded film or sheet may be passed over a specially prepared surface of a die roll positioned in close proximity to the exit of the die which imparts the desired surface characteristics to one side of the molten polymer. Thus, when the surface of such roll has minute peaks and valleys, film or sheet formed of polymer cast thereon will have a rough surface on the side which contacts the roll which generally conforms respectively to the valleys and peaks of the roll surface. Such die rolls are disclosed in, e.g., U.S. Pat. No. 4,035,549.

If desired, one or both surfaces of the high melt flow acid copolymer film or sheet may be treated to enhance the adhesion to other laminate layers. This treatment may take any form known within the art, including adhesives, primers, such as silanes, flame treatments (see, e.g., U.S. Pat. No. 2,632,921; U.S. Pat. No. 2,648,097; U.S. Pat. No. 2,683,894; and U.S. Pat. No. 2,704,382), plasma treatments (see e.g., U.S. Pat. No. 4,732,814), electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof. For example, a thin layer of carbon may be deposited on one or both surfaces of the film or sheet through vacuum sputtering as disclosed in U.S. Pat. No. 4,865,711. U.S. Pat. No. 5,415,942, on the other hand, discloses a hydroxy-acrylic hydrosol primer coating that may serve as an adhesion-promoting primer for poly(ethylene terephthalate) films.

The adhesive layer preferably can take the form of a monolayer of an adhesive primer or of a coating. The adhesive/primer coating may be less than 1 mil (0.03 mm), or preferably, less than 0.5 mil (0.013 mm), or more preferably, less than 0.1 mil (0.003 mm), thick. The adhesives may be any adhesive or primer known within the art. Preferably, the adhesives or primers are silane coupling agents or poly(vinyl amine) or poly(allyl amine). The poly(allyl amine)-based primers and their application to poly(ethylene terephthalate) polymeric films are disclosed within U.S. Pat. No. 5,411,845; U.S. Pat. No. 5,770,312; U.S. Pat. No. 5,690,994; and U.S. Pat. No. 5,698,329.

Safety Laminates

The invention further provides safety laminates comprising a polymeric interlayer sheet formed of the high melt flow acid copolymer composition. Specifically, the safety laminate of the invention comprises at least one rigid sheet layer and at least one layer of the high melt flow acid copolymer sheet that is described above as an interlayer sheet.

As discussed above, at the lamination temperatures used herein, the high melt flow acid copolymer interlayer sheets typically possess higher adhesion strength than those sheets derived from otherwise low melt flow acid copolymers, and therefore providing the safety laminate structures with improved shock resistance.

In accordance to the invention, the rigid sheets can be glass or rigid plastic sheets, such as, polycarbonate, acrylics, polyacrylate, cyclic polyolefins (e.g., ethylene norbornene polymers), metallocene-catalyzed polystyrene, polyamides, polyesters, fluoropolymers and the like and combinations thereof. Metal sheets (such as, aluminum, steel or galvanized steel) or ceramic plates may be substituted for the rigid polymeric sheet or glass.

The term "glass" is meant to include not only window glass, plate glass, silicate glass, sheet glass, low iron glass, tempered glass, tempered CeO-free glass, and float glass, but also to include colored glass, specialty glass (such as those include ingredients to control, e.g., solar heating), coated glass (such as those sputtered with metals (e.g., silver or indium tin oxide) for solar control purposes), E-glass, Toroglass, Solex® glass (a product of Solutia). Such specialty glasses are disclosed in, e.g., U.S. Pat. No. 4,615,989; U.S. Pat. No. 5,173,212; U.S. Pat. No. 5,264,286; U.S. Pat. No. 6,150,028; U.S. Pat. No. 6,340,646; U.S. Pat. No. 6,461,736; and U.S. Pat. No. 6,468,934. It is understood, however, that the type of glass to be selected for a particular laminate depends on the intended use.

One preferred embodiment of the invention is a safety laminate comprising at least one layer of glass, and at least one layer of the high melt flow acid copolymer sheet described above. Preferably, the high melt flow acid copolymer sheet is self-adhered to the glass. As used herein, when the a polymeric sheet is said to be "self-adhered" to the glass, it is meant that there is no intermediate layer such as a primer or thin adhesive layer between the glass and the polymeric layer, nor has the surface of the glass or polymeric layer been specially treated. A more preferred embodiment of the invention is a laminate comprising two layers of glass and at least one layer of the high melt flow acid copolymer sheets bonded in between. Preferably, the high melt flow acid copolymer sheet is self-adhered to one or both of the glass layers.

The safety laminate of the invention may further comprise other optional interlayer sheets and/or film layers. The other optional interlayer sheets may be formed of any suitable materials, such as, acid copolymers and ionomers derived therefrom, poly(ethylene vinyl acetate), poly(vinyl acetal) (e.g., poly(vinyl butyral)), polyurethane, polyvinylchloride, polyethylenes (e.g., metallocene-catalyzed linear low density polyethylenes), polyolefin block elastomers, ethylene acrylate ester copolymers (e.g., poly(ethylene-co-methyl acrylate) and poly(ethylene-co-butyl acrylate)), silicone elastomers and epoxy resins. In one preferred embodiment, the other interlayer is an acid copolymer composition comprising acid copolymer of an alpha olefin and about 1 to about 30 wt % of alpha,beta-ethylenically unsaturated carboxylic acid having 3 to 8 carbons, based on the total weight of the acid copolymer, wherein the acid copolymer has a Melt Index of about 75 to about 600 g/10 min, and may be the same or different than the one used in the first layer. The thickness of the other optional interlayer sheet(s) is not critical and may be independently varied depending on the particular application. The values provided above for the acid copolymer layer are preferred in many instances.

The film layers used in the safety laminates may be metal, such as aluminum foil, or polymeric. Preferable polymeric film materials include, but are not limited to, polyesters (e.g., poly(ethylene terephthalate) (PET)), poly(ethylene naphthalate), polycarbonate, polyolefins (e.g., polypropylene, polyethylene, and cyclic polyolefins), norbornene polymers, polystyrene (including syndiotactic polystyrene), styrene-acrylate copolymers, acrylonitrile-styrene copolymers, polysulfones (e.g., polyethersulfone, polysulfone, etc.), nylons, poly(urethanes), acrylics, cellulose acetates (e.g., cellulose acetate, cellulose triacetates, etc.), cellophane, vinyl chloride polymers (e.g., polyvinylidene chloride, vinylidene chloride copolymers, etc.), fluoropolymers (e.g., polyvinyl fluoride, polyvinylidene fluoride, polytetrafluoroethylene, ethylene-tetrafluoroethylene copolymers, etc.) and the like. More preferably, the polymeric film is a biaxially oriented poly(ethylene terephthalate) film.

The thickness of the polymeric film is not critical and may be varied depending on the particular application. In general, however, the thickness of the polymeric film may range from about 0.1 mils (0.003 mm) to about 10 mils (0.26 mm), or preferably, from about 1 mil (0.025 mm) to about 7 mils (0.18 mm).

In addition, the polymeric films are sufficiently stress-relieved and shrink-stable under the coating and lamination processes. Preferably, the polymeric films are heat stabilized to provide low shrinkage characteristics when subjected to elevated temperatures (i.e. less than 2% shrinkage in both directions after 30 min at 150° C.).

The films may also be coated if desired. For example, the films may be coated with organic infrared absorbers and sputtered metal layers, such as silver, coatings and the like. Metal coated polymeric films are disclosed in, e.g., U.S. Pat. No. 3,718,535; U.S. Pat. No. 3,816,201; U.S. Pat. No. 4,465,736; U.S. Pat. No. 4,450,201; U.S. Pat. No. 4,799,745; U.S. Pat. No. 4,846,949; U.S. Pat. No. 4,954,383; U.S. Pat. No.

4,973,511; U.S. Pat. No. 5,071,206; U.S. Pat. No. 5,306,547; U.S. Pat. No. 6,049,419; U.S. Pat. No. 6,104,530; U.S. Pat. No. 6,204,480; U.S. Pat. No. 6,255,031; and U.S. Pat. No. 6,565,982. For example, the coating may function as oxygen and moisture barrier coatings, such as the metal oxide coating disclosed within U.S. Pat. No. 6,521,825; U.S. Pat. No. 6,818, 819; and EP 1 182 710.

If desired, one or both surfaces of laminate layers, such as the acid copolymer interlayer sheet(s), the optional other interlayer sheet(s) or film layer(s), or the rigid sheet(s), may be treated to enhance their adhesion strength, as described above.

The safety laminate of the invention may take any form known within the art. Preferable specific glass laminate constructions include, for example, wherein "HMFAC" means the preferable high melt flow acid copolymer comprising interlayer sheet and multilayer sheet, as described above, glass/HMFAC;
glass/HMFAC/film;
glass/HMFAC/glass;
glass/HMFAC/film/HMFAC/glass;
glass/HMFAC/film/HMFAC/film;

and the like.

The safety laminates of the invention may be produced by any of the lamination process that are described below in detail, or by other processes.

Solar Cell Pre-Laminate Assemblies and Solar Cell Laminates

The invention further provides a solar cell pre-laminate assembly which comprises a solar cell component formed of one or a plurality solar cells and at least one layer of the high melt flow acid copolymer film or sheet that is described above.

Solar cells are commonly available on an ever increasing variety as the technology evolves and is optimized. Within the invention, a "solar cell" is meant to include any article which can convert light into electrical energy. Typical art examples of the various forms of solar cells include, for example, single crystal silicon solar cells, polycrystal silicon solar cells, microcrystal silicon solar cells, amorphous silicon based solar cells, copper indium selenide solar cells, compound semiconductor solar cells, dye sensitized solar cells, and the like. The most common types of solar cells include multicrystalline solar cells, thin film solar cells, compound semiconductor solar cells and amorphous silicon solar cells due to relatively low cost manufacturing ease for large scale solar cells.

Thin film solar cells are typically produced by depositing several thin film layers onto a substrate, such as glass or a flexible film, with the layers being patterned so as to form a plurality of individual cells which are electrically interconnected to produce a suitable voltage output. Depending on the sequence in which the multi-layer deposition is carried out, the substrate may serve as the rear surface or as a front window for the solar cell module. By way of example, thin film solar cells are disclosed in U.S. Pat. No. 5,512,107; U.S. Pat. No. 5,948,176; U.S. Pat. No. 5,994,163; U.S. Pat. No. 6,040,521; U.S. Pat. No. 6,137,048; and U.S. Pat. No. 6,258, 620. Examples of thin film solar cell modules are those that comprise cadmium telluride or CIGS, (Cu(In—Ga)(SeS)2), thin film cells.

In one particular embodiment, the solar cell pre-laminate assembly comprises one layer of the high melt flow acid copolymer film or sheet, which is positioned next to the solar cell component and serves as one of the encapsulant layers, or preferably, the high melt flow acid copolymer film or sheet is positioned next to the solar cell component at the light-receiving side and serves as the front encapsulant layer.

In accordance to the invention, besides the at least one high melt flow acid copolymer film or sheet, the solar cell pre-laminate assembly may optionally further comprise encapsulant layers formed of other polymeric materials, such as, acid copolymers and ionomers derived therefrom, poly(ethylene vinyl acetate), poly(vinyl acetal) (e.g., poly(vinyl butyral), including acoustic grades of poly(vinyl butyral)), polyurethane (PU), poly vinyl chloride, polyethylenes (e.g., linear low density metallocene-catalyzed polyethylenes), polyolefin block elastomers, ethylene acrylate ester copolymers (e.g., poly(ethylene-co-methyl acrylate) and poly(ethylene-co-butyl acrylate)), silicone elastomers and epoxy resins.

In a further embodiment, the solar cell pre-laminate assembly comprises two layers of the high melt flow acid copolymer film or sheet, wherein each of the two high melt flow acid copolymer films or sheets are laminated to each of the two sides of the solar cell component and serve as the front and back encapsulant layers.

The thickness of the individual encapsulant layers other than the high melt flow acid copolymer film(s) or sheet(s) is not critical and may be independently varied depending on the particular application. Preferably, the thickness of each of these encapsulant layers may independently range from about 1 mil (0.026 mm) to about 120 mils (3.00 mm), or more preferably, from about 1 mil to about 40 mils (1.02 mm), or most preferably, from about 1 mil to about 20 mils (0.51 mm). In addition, all the encapsulant layer(s) comprised in the solar cell pre-laminate assemblies, may have smooth or roughened surfaces. Preferably, however, the encapsulant layer(s) have roughened surfaces to facilitate the de-airing of the laminates through the lamination process.

In yet a further embodiment, the solar cell pre-laminate assembly may further comprise an incident layer and/or a backing layer serving as the outer layers of the assembly at the light-receiving side and the back side, respectively.

The outer layers of the solar cell pre-laminate assemblies, i.e., the incident layers and the backing layer, may be derived from any suitable sheets or films. Suitable sheets may be glass or plastic sheets, such as, polycarbonate, acrylics, polyacrylate, cyclic polyolefins (e.g., ethylene norbornene polymers), metallocene-catalyzed polystyrene, polyamides, polyesters, fluoropolymers and the like and combinations thereof. In addition, metal sheets, such as aluminum, steel, galvanized steel, or ceramic plates may be utilized in forming the backsheet.

Suitable film layers may be polymeric. Preferred polymers used to form the polymeric films, include but are not limited to, polyesters (e.g., poly(ethylene terephthalate)), poly(ethylene naphthalate), polycarbonate, polyolefins (e.g., polypropylene, polyethylene, and cyclic polyolefins), norbornene polymers, polystyrene (including syndiotactic polystyrene), styrene-acrylate copolymers, acrylonitrile-styrene copolymers, polysulfones (e.g., polyethersulfone, polysulfone, etc.), nylons, poly(urethanes), acrylics, cellulose acetates (e.g., cellulose acetate, cellulose triacetates, etc.), cellophane, vinyl chloride polymers (e.g., polyvinylidene chloride, vinylidene chloride copolymers, etc.), fluoropolymers (e.g., polyvinyl fluoride, polyvinylidene fluoride, polytetrafluoroethylene, ethylene-tetrafluoroethylene copolymers, etc.) and the like. Most preferably, the polymeric film is biaxially oriented polyester film (preferably poly(ethylene terephthalate film) or a fluoropolymer film (e.g., Tedlar®, Tefzel®, and Teflon® films, from E. I. du Pont de Nemours and Company, Wilmington, Del. (DuPont)). Fluoropolymer-polyester-fluoropolymer ("TPT") films are also preferred for some applications. Metal films, such as aluminum foil may also be used herein as the back-sheet.

The solar cell pre-laminate assembly of the invention, may optionally further comprise other functional film or sheet layers (e.g., dielectric layers or barrier layers) embedded within the assembly. Such functional layers may be derived from any of the above mentioned polymeric films or those that are coated with additional functional coatings. For example, poly(ethylene terephthalate) films coated with a metal oxide coating, such as those disclosed within U.S. Pat. No. 6,521,825; U.S. Pat. No. 6,818,819; and EP 1 182 710, may function as oxygen and moisture barrier layers in the laminates.

If desired, a layer of non-woven glass fiber (scrim) may also be included in the solar cell laminates to facilitate de-airing during the lamination process or to serve as reinforcement for the encapsulant layer(s). The use of such scrim layers within solar cell laminates is disclosed within, e.g., U.S. Pat. No. 5,583,057; U.S. Pat. No. 6,075,202; U.S. Pat. No. 6,204,443; U.S. Pat. No. 6,320,115; U.S. Pat. No. 6,323, 416; and EP 0 769 818.

In addition, it is understood that all the film or sheet layers positioned to the light-receiving side of the solar cell layer are made of transparent material to allow efficient transmission of sunlight into the solar cell component. In some instances, a special film or sheet may be included to serve both the function of an encapsulant layer and an outer layer. It is also conceivable that any of the film or sheet layers included in the assembly may be in the form of a pre-formed single-layer or multi-layer film or sheet.

If desired, one or both surfaces of the laminate layers of the solar cell pre-laminate assemblies may be treated to enhance the adhesion strength, as described above.

The solar cell pre-laminate assemblies may take any form known within the art. Preferable specific solar cell pre-laminate constructions (top (light incident) side to back side) include, for example, wherein "HMFAC" means the high melt flow acid copolymer encapsulant film, multilayer film, sheet and multilayer sheet of the invention, as described above, glass/HMFAC/solar cell/HMFAC/glass;
glass/HMFAC/solar cell/HMFAC/Tedlar® film;
Tedlar®film/HMFAC/solar cell/HMFAC/glass;
Tedlar® film/HMFAC/solar cell/HMFAC/Tedlar® film;
glass/HMFAC/solar cell/HMFAC/PET film;
Tedlar® film/HMFAC/solar cell/HMFAC/PET film;
glass/HMFAC/solar cell/HMFAC/barrier coated film/HMFAC/glass;
Tedlar® film/HMFAC/barrier coated film/HMFAC/solar cell/HMFAC/barrier coated film/HMFAC/Tedlar® film;
glass/HMFAC/solar cell/HMFAC/aluminum stock;
Tedlar® film/HMFAC/solar cell/HMFAC/aluminum stock;
glass/HMFAC/solar cell/HMFAC/galvanized steel sheet;
glass/HMFAC/solar cell/HMFAC/PET film/HMFAC/aluminum stock;
Tedlar® film/HMFAC/solar cell/HMFAC/PET film/HMFAC/aluminum stock;
glass/HMFAC/solar cell/HMFAC/PET film/HMFAC/galvanized steel sheet;
Tedlar® film/HMFAC/solar cell/HMFAC/PET film/HMFAC/galvanized steel sheet;
glass/HMFAC/solar cell/acoustic poly(vinyl butyral) encapsulant layer/glass;
glass/HMFAC/solar cell/poly(vinyl butyral) encapsulant layer/Tedlar® film;
Tedlar® film/HMFAC/solar cell/acid copolymer encapsulant layer/Tedlar® film;
glass/HMFAC/solar cell/ethylene vinyl acetate encapsulant layer/PET film;
Tedlar® film/HMFAC/solar cell/poly(ethylene-co-methyl acrylate) encapsulant layer/PET film;
glass/poly(ethylene-co-butyl acrylate) encapsulant layer/solar cell/HMFAC/barrier coated film/poly(ethylene-co-butyl acrylate) encapsulant layer/glass;

and the like. While reference in the above examples is to the preferred Tedlar® fluoropolymer film, it should be readily recognized that the above embodiments can also be made with other fluoropolymer film, such as a fluoropolymer-polyester-fluoropolymer trilayer film. While reference in the above examples is to the preferred poly(terephthalate) film, it should be readily recognize that any polyester film can be used. In addition, the term "glass" is intended to refer to sheets of any of the aforementioned types of glass or glass alternatives.

The invention further provides solar cell laminates derived from the solar cell pre-laminate assemblies disclosed above. Specifically the solar cell laminates are formed by subjecting the solar cell pre-laminate assemblies to further lamination process, as provided below in detail.

Moreover, as discussed above, under the lamination temperature used herein, the high melt flow acid copolymer encapsulant films or sheets typically possess higher adhesion strength than those encapsulant films or sheets derived from otherwise low melt flow acid copolymers at the reduced lamination conditions described herein, and therefore provide solar cell laminate structures with a simplified production process.

Lamination Process

The invention further provides a simplified process for producing the safety laminates or solar cell laminates. Specifically, as provided above, the incorporation of the high melt flow acid copolymer interlayer sheets or high melt flow acid copolymer solar cell encapsulant films or sheets requires reduced lamination temperatures, or cycle time, or both compared to the lamination temperatures or cycle times used in the process involving low melt flow acid copolymers.

In accordance to the invention, the lamination process may be an autoclave or non-autoclave process.

In an exemplary process, a glass sheet, a front encapsulant layer, a solar cell component, a back encapsulant layer and a backing layer (e.g., Tedlar® film), and a cover glass sheet are laid up and laminated together under heat and pressure and a vacuum (for example, in the range of about 27-28 inches (689-711 mm) Hg) to remove air. Preferably, the glass sheet has been washed and dried. A typical glass type is 90 mil thick annealed low iron glass. In an exemplary procedure, the pre-laminate assembly of the invention is placed into a bag capable of sustaining a vacuum ("a vacuum bag"), drawing the air out of the bag using a vacuum line or other means of pulling a vacuum on the bag, sealing the bag while maintaining the vacuum, placing the sealed bag in an autoclave at a temperature of about 100° C. to about 180° C., at a pressure of about 150-about 250 psi, preferably about 200 psi (about 15 bars), for about 10 to about 50 minutes. Preferably the bag is autoclaved at a temperature of about 100° C. to about 120° C. for about 20 to about 45 minutes. More preferably the bag is autoclaved at a temperature of about 110° C. to about 120° C. for about 20 to about 40 minutes. A vacuum ring may be substituted for the vacuum bag. One type of vacuum bags is disclosed within U.S. Pat. No. 3,311,517. The high melt flow acid copolymer films and sheets of the invention provides the desirable advantage of lower lamination temperatures and/or faster lamination cycle times, depending on the laminator's choice.

Any air trapped within the pre-laminate assembly may be removed through a nip roll process. For example, the pre-laminate assembly may be heated in an oven at a temperature of about 80° C. to about 120° C., or preferably, at a temperature of between about 90° C. and about 100° C., for about 15-60 (preferably about 30) minutes. Thereafter, the heated pre-laminate assembly is passed through a set of nip rolls so that the air in the void spaces between the solar cell outside layers, the solar cell component, and the encapsulant layers may be squeezed out, and the edge of the assembly sealed. This process may provide the final solar cell module or may provide what is referred to as a pre-press assembly, depending on the materials of construction and the exact conditions utilized.

The pre-press assembly may then be placed in an air autoclave where the temperature is raised to about 100° C. to about 160° C., or preferably, between about 110° C. and about 120° C., and pressure to between about 100 psig and about 300 psig, or preferably, about 200 psig (14.3 bar). These conditions are maintained for about 15 minutes to about 1 hour, or preferably, about 20 to about 50 minutes, after which, the air is cooled while no more air is added to the autoclave. After about 10-30 (preferably about 20) minutes of cooling, the excess air pressure is vented and the solar cell laminates are removed from the autoclave. This should not be considered limiting. Essentially any lamination process known within the art may be used herein.

A non-autoclave lamination process has been disclosed, e.g., within U.S. Pat. No. 3,234,062; U.S. Pat. No. 3,852,136; U.S. Pat. No. 4,341,576; U.S. Pat. No. 4,385,951; U.S. Pat. No. 4,398,979; U.S. Pat. No. 5,536,347; U.S. Pat. No. 5,853,516; U.S. Pat. No. 6,342,116; U.S. Pat. No. 5,415,909; US 2004-0182493; US 2003-0148114 A1; EP 1 235 683 B1; WO 91/01880; and WO 03/057478 A1. Generally, the non-autoclave process includes heating the pre-laminate assembly or the pre-press assembly and, optionally, the application of vacuum, pressure or both. For example, the pre-press may be successively passed through heating ovens and nip rolls. A commercial example of a photovoltaic lamination process includes the Icolam vacuum laminating systems of Meier Vakuumtechnik GmbH (Bocholt, Germany).

In producing solar cell laminates, if desired, the edges of the laminates may be sealed to reduce moisture and air intrusion and the potential degradation effect on the efficiency and lifetime of the solar cell(s) by any means disclosed within the art. Suitable edge seal materials include, but are not limited to, butyl rubber, polysulfide, silicone, polyurethane, polypropylene elastomers, polystyrene elastomers, block elastomers, styrene-ethylene-butylene-styrene (SEBS), and the like.

EXAMPLES

The following Examples and are intended to be illustrative of the invention, and are not intended in any way to limit the scope of the invention.

Methods

The following methods are used in the Examples presented hereafter.

Melt Index

Melt Index (MI) is measured by ASTM D1238 at 190° C. and a 2160 g load. A similar ISO test is ISO 1133.

I. Lamination Process 1:

The laminate layers described below are stacked (laid up) to form the pre-laminate assembly described within the examples. For the assembly containing a film layer as the incident or back-sheet layer, a cover glass sheet is placed over the film layer. The pre-laminate assembly is then placed within a Meier ICOLAM 10/08 laminator (Meier Vakuumtechnik GmbH, Bocholt, Germany). The lamination cycle includes an evacuation step (vacuum of 3 in. Hg) of 5.5 minutes and a pressing stage (pressure of 1000 mb) of 5.5 minutes at a temperature of 115° C. For Examples 9, 11, 41 and 43 only, an additional step at 145° C. for 5 minutes while maintaining the pressing conditions is incorporated to cure the composition. The laminate is then removed.

II. Lamination Process 2:

The laminate layers described below are stacked (laid up) to form the pre-laminate assemblies described within the examples. For the assembly containing a film layer as the incident or back-sheet layer, a cover glass sheet is placed over the film layer. The pre-laminate assembly is then placed within a vacuum bag, the vacuum bag is sealed and a vacuum is applied to remove the air from the vacuum bag. The bag is placed into an oven and heated to 90-100° C. for 30 minutes to remove any air contained between the assembly. The pre-press assembly is then subjected to autoclaving at 115° C. for 30 minutes in an air autoclave to a pressure of 200 psig (14.3 bar), as described above. The air is then cooled while no more air is added to the autoclave. After 20 minutes of cooling when the air temperature reaches less than about 50° C., the excess pressure is vented, and the laminate is removed from the autoclave.

Examples 1-15

The 12×12 in (305×305 mm) laminate structures described below in Table 1 are assembled and laminated by Lamination Process 1, above.

TABLE 1

Laminate Structures

| Example | Layer 1 | Layer 2 | Layer 3 | Layer 4 | Layer 5 |
|---|---|---|---|---|---|
| 1, 16 | Glass 1 | HMFAC 1 | HMFAC 1 | Glass 1 | |
| 2, 17 | Glass 1 | HMFAC 2 | Glass 1 | | |
| 3, 18 | Glass 2 | HMFAC 3 | PET 1 | HMFAC 3 | Glass 2 |
| 4, 19 | Glass 3 | HMFAC 4 | EVA | HMFAC 4 | Glass 1 |
| 5, 20 | Glass 1 | HMFAC 5 | HMFAC 5 | PET 2 | |
| 6, 21 | Glass 2 | HMFAC 6 | Glass 2 | | |
| 7, 22 | Glass 1 | HMFAC 7 | PET 3 | | |
| 8, 23 | Glass 1 | HMFAC 8 | EBA | HMFAC 8 | Glass 1 |
| 9, 24 | Glass 1 | HMFAC 9 | Glass 1 | | |
| 10, 25 | Glass 2 | HMFAC 10 | PET 4 | PVB | PET 1 |
| 11, 26 | Glass 1 | HMFAC 12 | HMFAC 11 | HMFAC 12 | Glass 1 |
| 12, 27 | Glass 2 | HMFAC 13 | EBA | HMFAC 13 | PET 5 |
| 13, 28 | Glass 1 | HMFAC 14 | PET 6 | HMFAC 14 | Glass 1 |
| 14, 29 | Glass 3 | HMFAC 15 | PET 1 | HMFAC 15 | Glass 2 |
| 15, 30 | Glass 1 | HMFAC 16 | HMFAC 16 | Glass 1 | |

HMFAC 1 is a 20 mil (0.51 mm) thick embossed sheet of Acid Copolymer A, a poly (ethylene-co-methacrylic acid) containing 15 wt % of polymerized residues of methacrylic acid and having a MI of 100 g/10 min.
HMFAC 2 is a 60 mil (1.52 mm) thick embossed tri-layer sheet having (i) two (2) 1 mil (0.03 mm) thick surface layers formed of a blend of Acid Copolymer B, a poly(ethylene-co-methacrylic acid) containing 18 wt % of polymerized residues of methacrylic acid and having a MI of 220 g/10 min, and 0.15 wt % of TINUVIN 328 (Ciba Specialty Chemicals Company), based on the total weight of the blend and (ii) a core layer of a poly(ethylene-co-isobutyl acrylate-co-methacrylic acid) containing 10 wt % of polymerized residues of isobutyl acrylate and 10 wt % of polymerized residues of methacrylic acid that is 70% neutralized with zinc ions and having a MI of 1 g/10 min.
HMFAC 3 is a 15 mil (0.38 mm) thick embossed tri-layer sheet having (i) two (2) 1 mil (0.03 mm) thick surface layers of Acid Copolymer C, poly(ethylene-co-methacrylic acid) containing 22 wt % of polymerized residues of methacrylic acid and having a MI of 400 g/10 min and (ii) a core layer of a poly(ethylene-co-n-butyl acrylate) containing 35 wt % of n-butyl acrylate and having a MI of 3 g/10 min.
HMFAC 4 is a 1 mil (0.03 mm) thick film of Acid Copolymer D, a poly(ethylene-co-methacrylic acid) containing 19 wt % of polymerized residues of methacrylic acid and having a MI of 150 g/10 min.
HMFAC 5 is a 20 mil (0.51 mm) thick embossed sheet of Acid Copolymer E, a composition comprising 99.5 wt % of Acid Copolymer A and 0.5 wt % of N-beta-(aminoethyl)-gamma-aminopropyltrimethoxysilane, based on the total weight of the composition.

TABLE 1-continued

HMFAC 6 is a 90 mil (2.25 mm) thick embossed tri-layer sheet having (i) two (2) 1 mil (0.03 mm) thick surface layers of Acid Copolymer F, a composition comprising 99.25 wt % of Acid Copolymer B and 0.25 wt % of N-beta-(aminoethyl)-gamma-aminopropyltrimethoxysilane, based on the total weight of the composition and (ii) a core layer of a poly(ethylene-co-methacrylic acid) containing 22 wt % of polymerized residues of methacrylic acid that is 35% neutralized with sodium ion and having a MI of 1.5 g/10 min.

HMFAC 7 is a 20 mil (0.51 mm) thick embossed tri-layer sheet having (i) two (2) 1 mil (0.03 mm) thick surface layers of Acid Copolymer G, a composition comprising 99.875 wt % of Acid Copolymer C and 0.125 wt % of N-beta-(aminoethyl)-gamma-aminopropyltrimethoxysilane, based on the total weight of the composition and (ii) a core layer of poly(ethylene-co-methyl acrylate) containing 25 wt % of polymerized residues of methyl acrylate and having a MI of 5 g/10 min.

HMFAC 8 is a 1 mil (0.03 mm) thick film of Acid Copolymer H, a composition comprising 99.875 wt % of Acid Copolymer D, 0.30 wt % of TINUVIN 1577, 0.30 wt % of CHIMASSORB 944 (products of the Ciba Specialty Chemicals Company), and 0.125 wt % of gamma-glycidoxypropyltriethoxysilane, based on the total weight of the composition.

HMFAC 9 is a 90 mil (2.25 mm) thick embossed tri-layer sheet having (i) two (2) 1 mil (0.03 mm) thick surface layers of Acid Copolymer E and (ii) a core layer of Acid Copolymer I, a composition comprising 98.5 wt % of Acid Copolymer A and 1.5 wt % of 1,1-bis(t-butylperoxy)-3,3,5-trimethylcyclohexane, based on the total weight of the composition.

HMFAC 10 is a 15 mil (0.38 mm) thick embossed sheet of Acid Copolymer J, a composition comprising 98.0 wt % of Acid Copolymer B and 2.0 wt % of 1,1-bis(t-butylperoxy)-3,3,5-trimethylcyclohexane, based on the total weight of the composition.

HMFAC 11 is a 20 mil (0.51 mm) thick embossed sheet of Acid Copolymer K, a composition comprising 95 wt % of Acid Copolymer C, 0.5 wt % of CYASORB UV-1164 (Cytec Industries), 2.5 wt % of trimethylolpropane triacrylate, and 2.5 wt % of 1,1-bis(t-butylperoxy)-3,3,5-trimethylcyclohexane, based on the total weight of the composition.

HMFAC 12 is a 1 mil (0.03 mm) thick film of Acid Copolymer L, a composition comprising 93.0 wt % of Acid Copolymer D, 5.0 wt % of triallyl isocyanurate and 2.0 wt % of 1,1-bis(t-butylperoxy)-3,3,5-trimethylcyclohexane, based on the total weight of the composition.

HMFAC 13 is a 1 mil (0.03 mm) thick film of Acid Copolymer M, a composition comprising 98.0 wt % of Acid Copolymer A, 0.5 wt % of vinyltrimethoxysilane, and 1.5 wt % of 1,1-bis(t-butylperoxy)-3,3,5-trimethylcyclohexane, based on the total weight of the composition.

HMFAC 14 is a 20 mil (0.51 mm) thick embossed sheet of Acid Copolymer N, a composition comprising 97.75 wt % of Acid Copolymer B, 0.25 wt % of gamma-methacryloxypropyltrimethoxysilane, and 2.0 wt % of 1,1-bis(t-butylperoxy)-3,3,5-trimethylcyclohexane, based on the total weight of the composition.

HMFAC 15 is a 15 mil (0.38 mm) thick embossed sheet of Acid Copolymer O, a composition comprising 97.375 wt % of Acid Copolymer C, 0.125 wt % of N-beta-(N-vinylbenzylaminoethyl)-gamma-aminopropyltrimethoxysilane, and 2.5 wt % of 1,1-bis(t-butylperoxy)-3,3,5-trimethylcyclohexane, based on the total weight of the composition.

HMFAC 16 is a 90 mil (2.25 mm) thick embossed sheet of Acid Copolymer P, a composition comprising 94.875 wt % of Acid Copolymer D, 3 wt % of trimethylolpropane triacrylate, 0.125 wt % of N-beta-(N-vinylbenzylaminoethyl)-gamma-aminopropyltrimethoxysilane, CYASORB UV-1164, and TINUVIN 123, and 2.0 wt % of 1,1-bis(t-butylperoxy)-3,3,5-trimethylcyclohexane, based on the total weight of the composition.

EBA is a 30 mil (0.76 mm) thick sheet formed of a poly(ethylene-co-n-butyl acrylate) containing 30 wt % of polymerized residues of n-butyl acrylate and having a MI of 2 g/10 min.

EVA is SC50B, believed to be a formulated composition based on poly(ethylene-co-vinyl acetate) in the form of a 20 mil thick (0.51 mm) sheet (Hi-Sheet Corporation, formerly Mitsui Chemicals Fabro, Inc.).

Glass 1 is 2.5 mm thick float glass.

Glass 2 is a 2.5 mm thick clear annealed float glass plate layer.

Glass 3 in a 3.0 mm thick Solex ® solar control glass.

PET 1 is a 7 mils (0.18 mm) thick poly(allyl amine)-primed, biaxially-oriented poly(ethylene terephthalate) film layer.

PET 2 is a XIR ®-70 HP Auto film (Southwall Company).

PET 3 is a XIR ®-75 Auto Blue V-1 film (Southwall Company).

PET 4 is a Soft Look ® UV/IR 25 solar control film (Tomoegawa Paper Company, Ltd., of Tokyo, Japan).

PET 5 is a XIR ®75 Green film (Southwall Company).

PET 6 is RAYBARRIER ® TFK-2583 solar control film (Sumitomo Osaka Cement Company).

PVB is B51V, believed to be a formulated composition based on poly(vinyl butyral) in the form of a 20 mil thick (0.51 mm) sheet (DuPont).

Examples 16-30

The 12×12 in (305×305 mm) laminate structures described above in Table 1 are assembled and laminated by Lamination Process 2, above.

Examples 31-43

The 12×12 in (305×305 mm) solar cell laminate structures described below in Table 2 are assembled and laminated by Lamination Process 1, above. Layers 1 and 2 constitute the incident layer and front-sheet encapsulant layer, respectively, and Layers 4 and 5 constitute the back-sheet encapsulant layer and the backing layer, respectively.

TABLE 2

Solar Cell Laminate Structures

| Example | Layer 1 | Layer 2 | Layer 3 | Layer 4 | Layer 5 |
|---|---|---|---|---|---|
| 31, 44 | Glass 4 | HMFAC 1 | Solar Cell 1 | HMFAC 1 | FPF |
| 32, 45 | Glass 4 | EVA | Solar Cell 2 | HMFAC 2 | Glass 1 |
| 33, 46 | Glass 4 | HMFAC 3 | Solar Cell 3 | HMFAC 2 | AL |
| 34, 47 | FPF | HMFAC 4 | Solar Cell 1 | HMFAC 4 | FPF |
| 35, 48 | Glass 1 | HMFAC 5 | Solar Cell 2 | HMFAC 5 | PET 1 |
| 36, 49 | Glass 4 | HMFAC 7 | Solar Cell 3 | HMFAC 6 | FPF |
| 37, 50 | FPF | HMFAC 8 | Solar Cell 3 | HMFAC 8 | FPF |
| 38, 51 | Glass 2 | HMFAC 10 | Solar Cell 4 | HMFAC 9 | Glass 2 |
| 39, 52 | Glass 4 | HMFAC 11 | Solar Cell 1 | HMFAC 11 | FPF |
| 40, 53 | FPF | HMFAC 12 | Solar Cell 2 | HMFAC 12 | PET 1 |
| 41, 54 | FPF | HMFAC 13 | Solar Cell 4 | HMFAC 13 | FPF |
| 42, 55 | Glass 4 | HMFAC 14 | Solar Cell 1 | HMFAC 14 | Glass 1 |
| 43, 56 | Glass 4 | HMFAC 15 | Solar Cell 4 | HMFAC 16 | |

AL is a 3.2 mm thick aluminum sheet (3.2 mm thick) that is 5052 alloyed with 2.5 wt % of magnesium and conforms to Federal specification QQ-A-250/8 and ASTM B209.

FPF is a 1.5 mil (0.038 mm) thick corona surface treated Tedlar ® film, DuPont.

Glass 4 is Starphire ® glass from the PPG Corporation.

Solar Cell 1 is a 10-inch by 10-inch amorphous silicon photovoltaic device comprising a stainless steel substrate (125 micrometers thick) with an amorphous silicon semiconductor layer (see, e.g., U.S. Pat. No. 6,093,581, Example 1).

Solar Cell 2 is a 10-inch by 10-inch copper indium diselenide (CIS) photovoltaic device (see, e.g., U.S. Pat. No. 6,353,042, column 6, line 19).

Solar Cell 3 is a 10-inch by 10-inch cadmium telluride (CdTe) photovoltaic device (see, e.g., U.S. Pat. No. 6,353,042, column 6, line 49).

Solar Cell 4 is a silicon solar cell made from a 10-inch by 10-inch polycrystalline EFG-grown wafer (see, e.g., U.S. Pat. No. 6,660,930, column 7, line 61).

Examples 44-56

The 12×12 in (305×305 mm) solar cell laminate structures described above in Table 2 are assembled and laminated by Lamination Process 2, above. Layers 1 and 2 constitute the incident layer and the front-sheet encapsulant layer, respectively, and Layers 4 and 5 constitute the back-sheet encapsulant layer and the backing layer, respectively.

Comparative Example CE1 and Example 57

In Comparative Example CE1, 50 grams of a poly(ethylene-co-methacrylic acid) copolymer containing 12 wt % polymerized residues of methacrylic acid and having a MI of 3.3 g/10 min was added to a 90° C. preheated Brabender Rheometer (C. W. Brabender Instruments, Inc., So. Hackensack, N.J.) equipped with a 50 cc mixing head over 1 minute, while the speed of the mixing blades was set at 8 rpm. The process was shut down after approximately ⅓ of the polymer resin had been added since the resin was not melting or mixing with resin pellets flying out at the top of the Brabender.

In Example 57, 50 grams of a poly(ethylene-co-methacrylic acid) copolymer containing 19 wt % polymerized residues of methacrylic acid and having a MI of 86 g/10 min was added to a 90° C. preheated Brabender Rheometer equipped with a 50 cc mixing head over 1 minute, while the speed of the mixing blades was set at 8 rpm. The speed of mixing blades was then increased to 30 rpm and the polymer resin was further mixed for 5 minutes, after which, a homogeneous polymer melt was achieved with the mixing motor at 0.5 amp and the polymer melt temperature at 106° C. The process was shut down.

The results demonstrated that high flow acid copolymers (Example 57) can be compounded at temperatures low enough (about 90° C.) for the incorporation of organic peroxides through commercially-viable and scalable extrusion compounding equipment while corresponding low flow acid copolymers (Comparative Example CE1) can not.

What is claimed is:

1. A process for manufacturing a solar cell module, said process comprising the steps of:
   (i) providing a composition consisting essentially of a non-neutralized acid copolymer of a non-neutralized acid copolymer of an alpha olefin and about 15 to about 23 wt % of alpha,beta-ethylenically unsaturated carboxylic acid having 3 to 8 carbons, based on the total weight of the acid copolymer, wherein the acid copolymer has a Melt Index of greater than 100 to about 600 g/10 min, as measured by ASTM D1238 at 190° C. and under a load of 2160 g; and about 0.01 to about 10 wt %, based upon the total weight of the acid copolymer composition, of an organic peroxide;
   (ii) compounding the composition at a temperature of 100° C. or less to prevent premature cross-linking;
   (iii) extruding the composition at a temperature of 100° C. or less to form a polymeric film or sheet;
   (iv) forming a solar cell pre-laminate assembly comprising the polymeric film or sheet and a solar cell component, said solar cell component comprising one or a plurality of solar cells; and
   (v) laminating the solar cell pre-laminate assembly to form the solar cell module by subjecting the solar cell pre-laminate assembly to heat at a temperature of 115° C. or greater to cure the composition and, optionally, subjecting the assembly to vacuum, to positive pressure, or to a second heating step at a temperature of 145° C.;
   wherein the composition of the polymeric film or sheet is cross-linked in the solar cell module.

2. The process of claim 1, wherein (a) the alpha olefin is ethylene; (b) the alpha,beta-ethylenically unsaturated carboxylic acid is selected from the group consisting of acrylic acid, methacrylic acid, itaconic acid, maleic acid, maleic anhydride, fumaric acid, monomethyl maleic acid, and mixtures thereof; and (c) the acid copolymer has a Melt Index of greater than 100 to about 400 g/10 min.

3. The process of claim 2, wherein the acid copolymer comprises about 18 to about 23 wt % of repeat units from the alpha,beta-ethylenically unsaturated carboxylic acid.

4. The process of claim 1, wherein the composition comprises about 0.5 to about 3.0 wt % of the organic peroxide, based on the total weight of the acid copolymer composition, and the organic peroxide is selected from the group consisting of 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha,alpha'-bis(tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide and mixtures thereof.

5. The process of claim 1, wherein the polymeric film or sheet has a thickness of about 0.1 to about 20 mils.

6. The process of claim 1, wherein:
   (a) the polymeric film or sheet has a thickness of about 0.1 to about 20 mils;
   (b) the alpha olefin is ethylene;
   (c) the alpha,beta-ethylenically unsaturated carboxylic acid is selected from the group consisting of acrylic acid, methacrylic acid, itaconic acid, maleic acid, maleic anhydride, fumaric acid, monomethyl maleic acid, and mixtures thereof;
   (d) the acid copolymer has a Melt Index of greater than 100 to about 400 g/10 min;
   (e) the acid copolymer comprises about 18 to about 23 wt % of repeat units from the alpha,beta-ethylenically unsaturated carboxylic acid; and
   (f) wherein the composition comprises about 0.5 to about 3.0 wt % of the organic peroxide, based on the total weight of the acid copolymer composition, and the organic peroxide is selected from the group consisting of 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha,alpha'-bis(tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide and mixtures thereof.

7. The process of claim 6, wherein the acid copolymer comprises about 19 to about 22 wt % of repeat units from the alpha,beta-ethylenically unsaturated carboxylic acid, based on the total weight of the acid copolymer.

8. The process of claim 1, wherein the composition further comprises about 0.01 to about 5 wt %, based on the total weight of the acid copolymer composition, of a silane coupling agent.

9. The process of claim 8, wherein the composition comprises about 0.05 to about 1 wt % of the silane coupling agent, based on the total weight of the acid copolymer composition, and the silane coupling agent is selected from the group consisting of gamma-chloropropylmethoxysilane, vinyltrimethoxysilane, vinyltriethoxysilane, vinyltris(beta-methoxyethoxy)silane, gamma-vinylbenzylpropyltrimethoxysilane, N-beta-(N-vinylbenzylaminoethyl)-gamma-aminopropyltrimethoxysilane, gamma-methacryloxypropyltrimethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and mixtures thereof.

10. The process of claim 6, wherein the composition further comprises about 0.01 to about 5 wt %, based on the total weight of the acid copolymer composition, of a silane coupling agent.

11. The process of claim 1 wherein the solar cell pre-laminate assembly contains an additional layer selected from the group consisting of glass, other polymeric interlayer sheets, polymeric film layers, and metal films or sheets.

12. The process of claim 1, wherein the solar cell pre-laminate assembly comprises an incident layer that is formed of a transparent material and serves as an outer layer at the light-receiving side of the assembly.

13. The process of claim 1, wherein the solar cell pre-laminate assembly comprises a backing layer that is formed of glass, a plastic film or sheet, or a metal film or sheet and serves as an outer layer at the back side of the assembly.

14. The process of claim 12, wherein the solar cell pre-laminate assembly comprises a backing layer that is formed of glass, a plastic film or sheet, or a metal film or sheet and serves as an outer layer at the back side of the assembly.

15. The process of claim 1, wherein the solar cell pre-laminate assembly further comprises a second polymeric encapsulant layer that is positioned next to the solar cell component on the opposite side from the polymeric film or sheet, wherein the second polymeric encapsulant layer comprises a polymeric composition selected from the group consisting of poly(vinyl acetal), ethylene vinyl acetate, polyurethane, polyvinylchloride, polyethylenes, polyolefin block elastomers, ethylene acrylate ester copolymers, copolymer of alpha olefin and alpha,beta-ethylenically unsaturated carboxylic acid and ionomers thereof, silicone elastomers and epoxy resins.

16. The process of claim 6, wherein the solar cell pre-laminate assembly comprises (a) an incident layer that is formed of a transparent material and serves as an outer layer at the light-receiving side of the solar cell pre-laminate assembly, and (b) a backing layer that is formed of glass, a plastic film or sheet, or a metal film or sheet and serves as an outer layer at the back side of the solar cell pre-laminate assembly.

17. The process of claim 16, wherein the solar cell pre-laminate assembly further comprises a second polymeric encapsulant layer that is positioned next to the solar cell component on the opposite side from the polymeric film or sheet, wherein the second polymeric encapsulant layer comprises a polymeric composition selected from the group consisting of poly(vinyl acetal), ethylene vinyl acetate, polyurethane, polyvinylchloride, polyethylenes, polyolefin block elastomers, ethylene acrylate ester copolymers, copolymer of alpha olefin and alpha,beta-ethylenically unsaturated carboxylic acid and ionomers thereof, silicone elastomers and epoxy resins.

18. The process of claim 16, wherein the composition further comprises about 0.01 to about 5 wt %, based on the total weight of the acid copolymer composition, of a silane coupling agent.

19. The process of claim 18, wherein the composition contains about 0.05 to about 1 wt % of the silane coupling agent, based on the total weight of the acid copolymer composition, and the silane coupling agent is selected from the group consisting of gamma-chloropropylmethoxysilane, vinyltrimethoxysilane, vinyltriethoxysilane, vinyltris(beta-methoxyethoxy)silane,gamma-vinylbenzylpropyltrimethoxysilane, N-beta-(N-vinylbenzylaminoethyl)-gamma-aminopropyltrimethoxysilane, gamma-methacryloxypropyltrimethoxysilane, vinyltriacetoxysilane, gamma-glycidoxypropyltrimethoxysilane, gamma-glycidoxypropyltriethoxysilane, beta-(3,4-epoxycyclohexyl)ethyltrimethoxysilane, vinyltrichlorosilane, gamma-mercaptopropylmethoxysilane, gamma-aminopropyltriethoxysilane, N-beta-(aminoethyl)-gamma-aminopropyltrimethoxysilane, and mixtures thereof.

20. The process of claim 17, wherein the composition further comprises about 0.01 to about 5 wt %, based on the total weight of the acid copolymer composition, of a silane coupling agent.

* * * * *